United States Patent [19]

Pazik

[11] Patent Number: 5,022,679
[45] Date of Patent: Jun. 11, 1991

[54] VEHICLE GAS TANK

[76] Inventor: John A. Pazik, 5333 Perry Ave. North, Minneapolis, Minn. 55429

[21] Appl. No.: 531,124

[22] Filed: May 31, 1990

[51] Int. Cl.$^5$ .............................. B60P 7/06; B60R 3/00
[52] U.S. Cl. ..................................... 280/833; 280/834; 280/164.1; 220/480
[58] Field of Search ............... 280/831, 833, 834, 848, 280/851, 163, 164.1; 180/69.4, 69.5; 220/480, 481, 562

[56] References Cited

U.S. PATENT DOCUMENTS

| D. 290,452 | 6/1987 | Balek | D12/155 |
|---|---|---|---|
| 1,023,848 | 4/1912 | Huff | 280/833 X |
| 1,074,107 | 9/1913 | Dunham | 280/834 X |
| 1,326,879 | 12/1919 | Roos | 280/848 |
| 1,411,378 | 4/1922 | Robison | 280/834 |
| 1,797,873 | 3/1931 | McManus | 280/833 |
| 3,894,705 | 7/1975 | Glassmeyer | 280/833 X |
| 4,357,027 | 11/1982 | Zeitlow | 280/834 |

FOREIGN PATENT DOCUMENTS 3445427 7/1985 Fed. Rep. of Germany ...... 280/834

OTHER PUBLICATIONS

Street Scene Magazine, Aug. 1984, p. 53.
1982. Street Rod Annual, Various Pages Showing Laeger Tank.
Street Rodder Magazine, Feb. 1976, pp. 37 and 38.
Rod Action Magazine, Aug. 1981, pp. 28-31.
Rod & Custom Magazine #4, 1978, pp. 49-51 and 53.

*Primary Examiner*—Andres Kashnikow
*Assistant Examiner*—Brian Johnson
*Attorney, Agent, or Firm*—James W. Miller

[57] ABSTRACT

An improved saddle tank for a car fits into the space between the splash apron and a frame member of the car. The saddle tank includes at least one attachment bracket having bolt holes which may be aligned with the bolt holes in a running board bracket. Thus, the fasteners for the running board bracket also pass through the holes in the attachment bracket to hold the tank against the frame member when the attachment bracket is interposed between the frame member and the running board bracket. In addition, the tank is sized so that its top surface lies closer to the top of the frame member than prior art tanks to maximize tank capacity.

17 Claims, 4 Drawing Sheets

VEHICLE GAS TANK

TECHNICAL FIELD

The present invention relates to a vehicle, such as an automobile, having running boards supported on the automobile by running board brackets. More particularly, the present invention relates to an improved saddle tank for use on this type of automobile for holding fuel.

BACKGROUND OF THE INVENTION

Automobiles built many years ago typically had "running boards" on either side of the car adjacent the passenger compartment. The running boards formed a step for helping passengers enter the car since the passenger compartment was significantly elevated above the ground. The running boards were spaced beneath the bottom edge of the passenger compartment. The gap between the running boards and the passenger compartment was covered with another piece known as a "splash apron".

The running boards were supported on a side frame member of the car by L-shaped running board brackets. One leg of each bracket, i.e. the vertical leg, was bolted to the side frame member. The other leg of the bracket, i.e. the horizontal leg, extended outwardly away from the side frame member. The running board was laid over the top of the horizontal legs of two such spaced brackets outboard of the splash apron and was secured thereto with threaded fasteners, such as bolts.

Cars having running boards of this type have not been built as original equipment for a long time. However, many such cars still exist and some are considered "classics" or "antiques". These cars are actively restored and collected by many people. Such a collector normally wishes the external and internal appearance of the car to be as accurate to the original as possible.

In many other cases, the basic design of a "classic" car serves as the foundation for a "street rod". In the case of a street rod, various departures are usually made from the design of the original car, such as using a modern engine which may be left exposed rather than being covered, using a modern suspension and tires, etc. However, the general outward appearance of the car, including the body shell, running boards, splash apron, and fenders, is often retained. In addition, a frame resembling the shape of the original frame is also used though the frame is usually modified for strength and crossmembers are added to support late model drive trains. In fact, various companies provide reproduction chassis components, used in the building of street rods, which are duplicates of the corresponding original equipment parts. These components are known in the street rod trade as reproduction components, i.e. running board brackets that duplicate the original equipment running board brackets are referred to as reproduction running board brackets.

In many cars of the type popularly used in street rods, the original equipment gas tank was mounted in front of the passenger compartment adjacent the engine. These gas tanks were known as "cowl mounted" tanks as they were enclosed within the engine "cowl" with the filler tube for the tank typically coming up through the cowl to be closed by an external gas cap located on top of the cowl. However, cowl mounted tanks are not preferred today for a variety of reasons, one of which is safety. A cowl mounted tank poses a greater risk of fire and possible injury to the passengers in the event of an accident. Accordingly, tanks have been mounted in other places in street rods wherever available space can be found.

Saddle tanks for these cars have been designed to fit into the space between the side frame member of the car and the splash apron. Two such tanks, one on each side of the car, are typically used. The filler tubes for these tanks often extend out through the splash apron. Alternatively, the tanks can even be connected to a cowl mounted filler tube if the original appearance of the car is to be preserved to the maximum extent possible. The tanks are basically shaped to conform to the available space between the frame and the splash apron. When so installed, the tanks in normal operation and use of the car will be completely hidden by the splash apron and the adjacent running board.

In one known set of saddle tanks, the stock running board brackets, the faces of which are slightly rounded, are replaced with a custom set of running board brackets. These custom brackets have a flat horizontal leg on which the saddle tank rests. In addition, two elongated retaining straps extend around the saddle tank between the face of the side frame member and the horizontal legs of the bracket. The retaining straps hold the tank in place on the side frame member when the straps are bolted to the side frame member and the bracket.

While these saddle tanks are effective in storing fuel, such as gasoline, in a safer location than in a cowl mounted tank, they have a number of disadvantages. First, the custom running board brackets do not mount to the side frame member in the same manner as the stock brackets which they replace. Thus, additional holes have to be drilled in the side frame member for receiving the threaded fasteners used to hold the custom brackets in place and for receiving the fasteners used to secure the retaining straps to the side frame member. This involves more work and requires that the holes be precisely drilled in the right place. This can be difficult to do and costly to correct if the holes are incorrectly drilled.

Moreover, in the prior art saddle tanks held in place by retaining straps passing around the tank, the top of the tank has to be spaced below the top of the side frame member to accommodate the upper end of the strap and the bolt which secures that strap to the side frame member. This spacing is necessary to provide access to the strap bolt to allow the bolt to be tightened or untightened when the tank is installed or removed. However, the need for such spacing also decreases the tank capacity since there is this unused space between the top of the tank and the top of the adjacent side frame member. Obviously, it would be better if the tank could rise to be closer to the top of the side frame member in this area, thereby increasing the tank capacity.

SUMMARY OF THE INVENTION

Accordingly, it is one aspect of this to provide a saddle tank for use on an automobile having a frame member, a running board carried on the frame member by at least one running board bracket, and a splash apron extending between the running board and the top of the frame member. The saddle tank is received in the space between the splash apron and the frame member. The saddle tank has attachment means thereon cooperable with the running board bracket for holding the saddle tank in place on the frame member when the running board bracket is attached to the frame member.

BRIEF DESCRIPTION OF THE DRAWINGS

The present invention will be described hereafter in the Detailed Description, when taken in conjunction with the following drawings, in which like reference numerals refer to like elements throughout.

DETAILED DESCRIPTION

Figure 2:
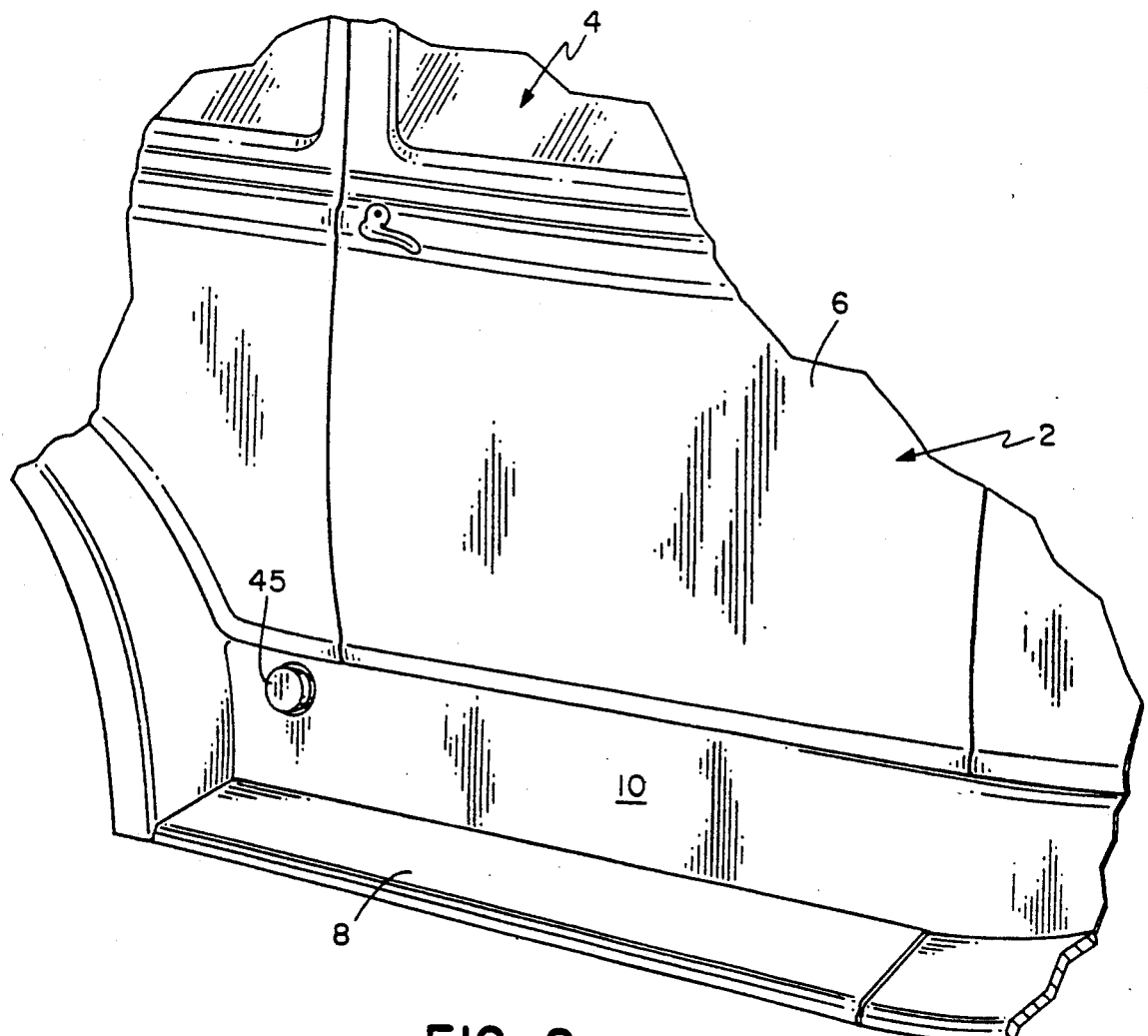
FIG. 2 is a perspective view of a portion of an automobile in which the improved fuel tank of the present invention is installed, the fuel tank being hidden in this view by the running board and splash apron of the automobile which completely cover the fuel tank in normal use of the tank.

Referring first to FIG. 2, an automobile of the type to which the present invention relates is generally depicted as 2. Automobile 2 includes a passenger compartment 4 having a door 6, a running board 8 spaced below the lower edge of door 6, and a splash apron 10 which fills in the space between running board 8 and door 6. Car 2 is of a type which is now considered to be "classic" and which is often the basis for a street rod. As shown herein, car 2 is preferably a Model A Ford, e.g. 1928-1931 vintage.

As shown in FIGS. 3-5 and 8, running board 8 is held in place on a frame member 12 of car 2 by two L-shaped running board brackets 14. These running board brackets 14 have a vertical leg 16 with three holes 18 spaced in a triangular pattern at the upper end for securing bracket 14 to frame member 12. Various threaded fasteners 20, such as bolts, pass through holes 18 and into attachment holes (not shown) provided for fasteners 20 in frame member 12. In addition, running board brackets 14 include a horizontal leg 22 which extends outwardly away from frame member 12 of car 2. Horizontal legs 22 include holes 24 for receiving other fasteners which hold running board 8 in place on top of running board brackets 14.

Running board brackets 14 as shown herein shall be referred to as "stock" brackets, i.e. either the original equipment brackets supplied by Ford for the Model A or reproductions of these brackets. In such brackets, vertical leg 16 has a distinctive rounded face. Such stock brackets 14 are often supplied by those companies who manufacture reproduction classic car components along with reproduction frames in which the attachment holes for brackets 14 are provided.

Figure 3:
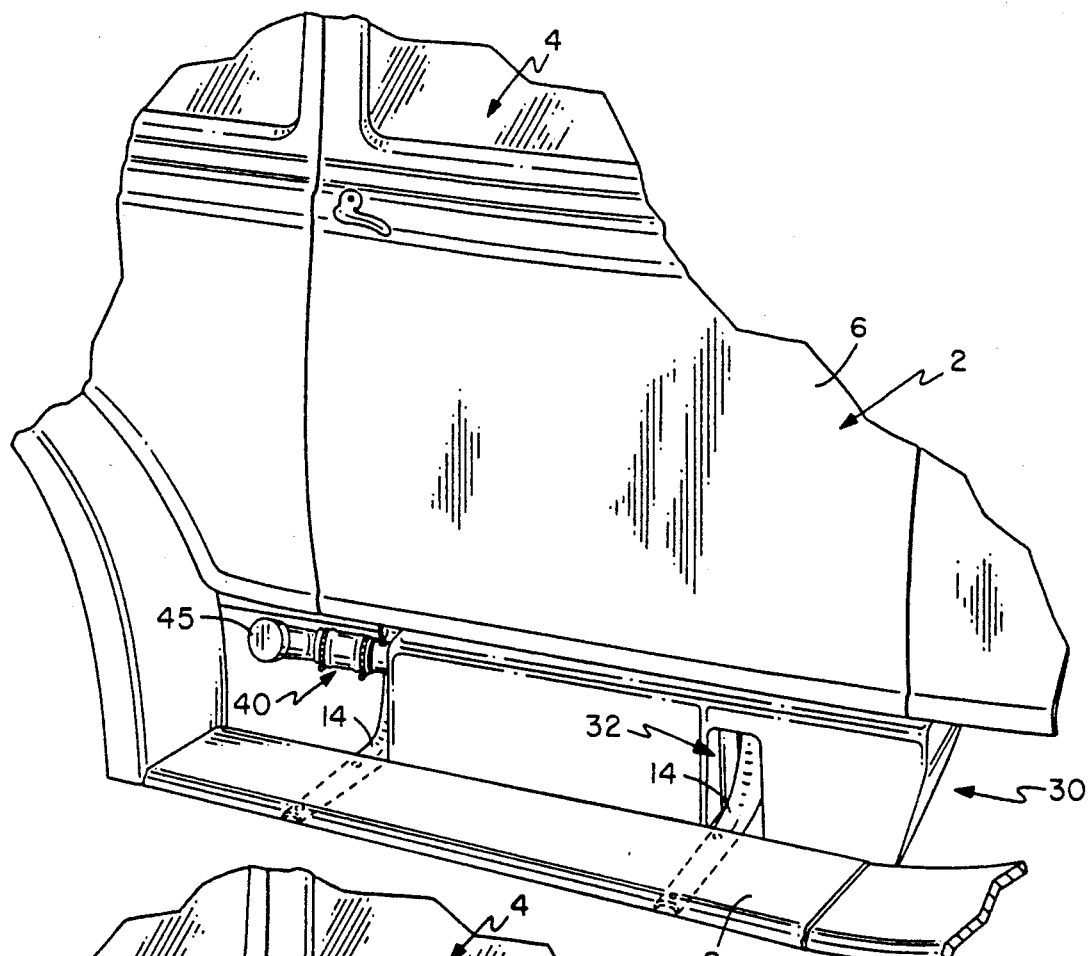
FIG. 3 is a perspective view similar to that of FIG. 2, but in which the splash apron has been removed from the automobile, while the running board is shown left in place, to better illustrate the improved fuel tank of the present invention.
Figure 4:
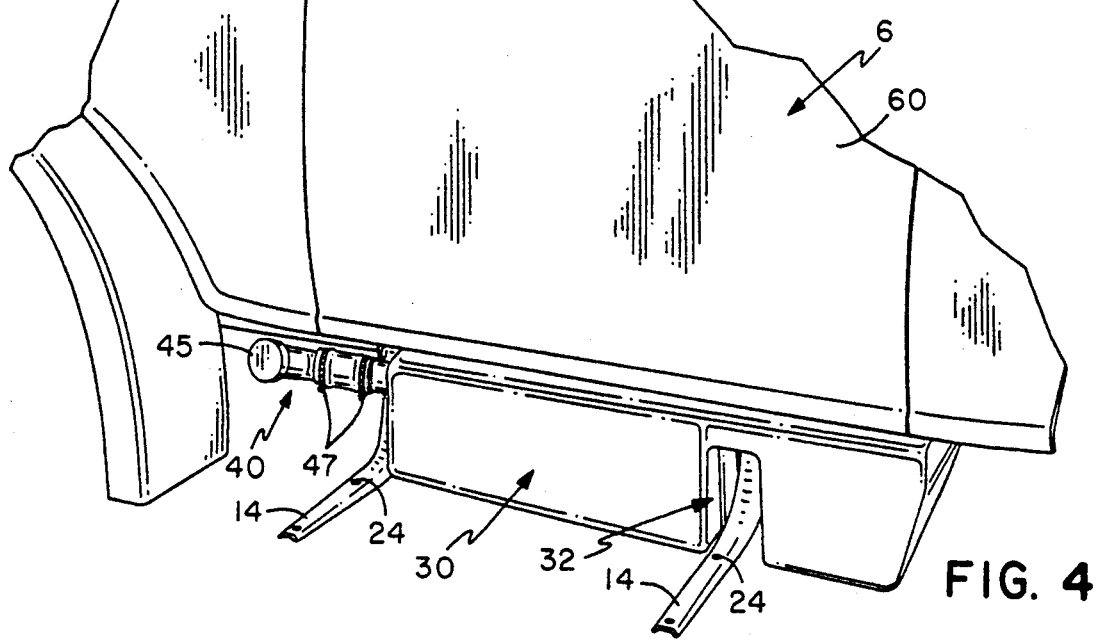
FIG. 4 is a perspective view similar to that of FIG. 2, but in which both the splash apron and running board have been removed from the automobile to more completely illustrate the improved fuel tank of the present invention.
Figure 5:
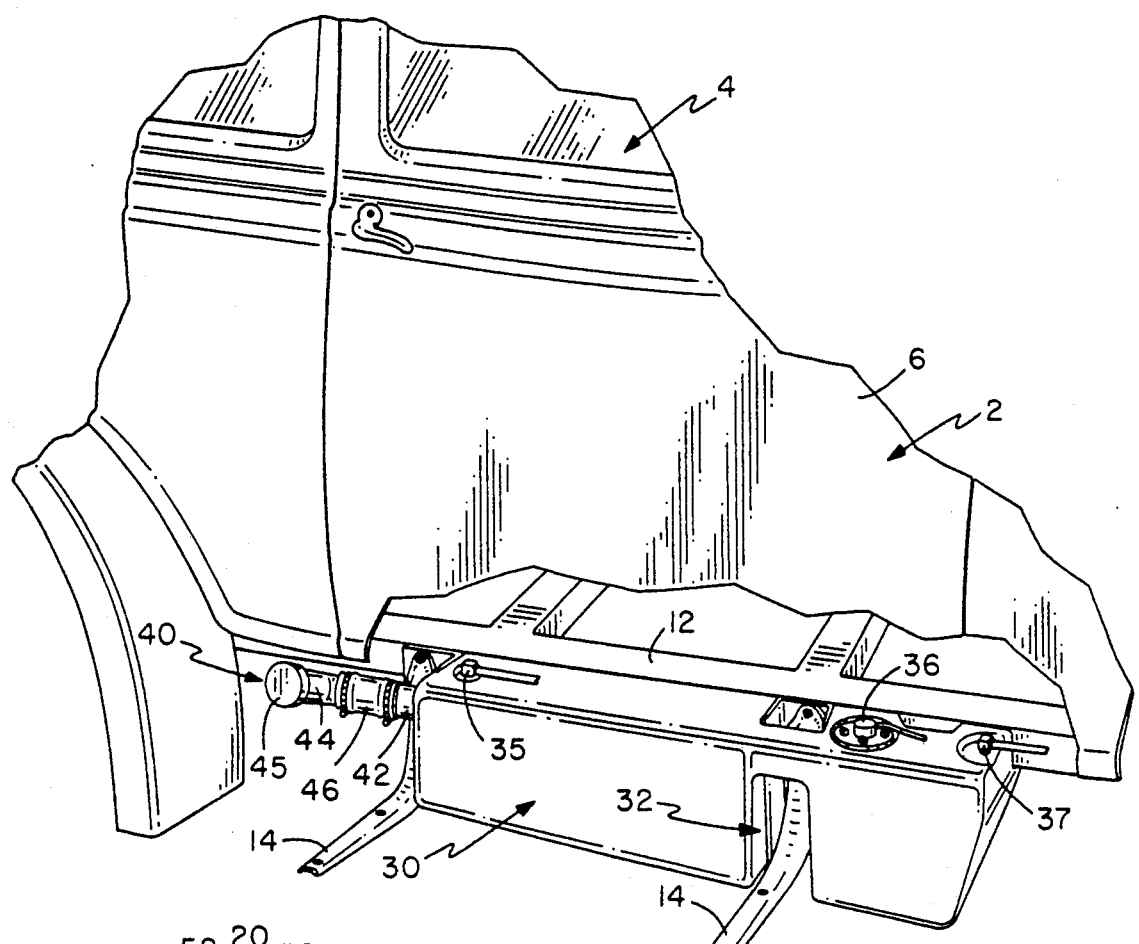
FIG. 5 is a perspective view similar to that of FIG. 4, in which the splash apron and running board have been removed, and in which the passenger compartment of the automobile has been partially broken away to more completely illustrate the top of the improved fuel tank of the present invention.

The present invention relates to an improved saddle tank 30 for use in holding fuel, such as gasoline, in car 2. As shown in FIGS. 3 and 4, saddle tank 30 fits in the space behind splash apron 10 and is completely covered and hidden by splash apron 10 and running board 8 during normal use of car 2. In FIG. 3 splash apron 10 has been removed, and in FIG. 4 both splash apron 10 and running board 8 have been removed, to more clearly illustrate saddle tank 30 of this invention. Normally, both splash apron 10 and running board 8 are installed as shown in FIG. 2. Two such saddle tanks 30 are normally used with car 2, one on either side of car 2.

Figure 1:
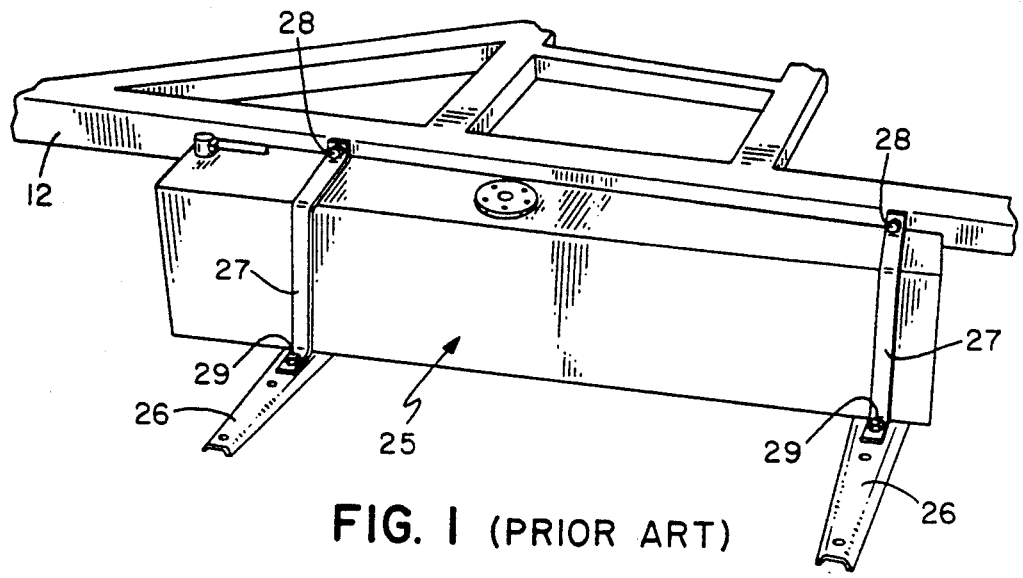
FIG. 1 is a perspective view of a prior art saddle tank, particularly illustrating the use of retaining straps and custom running board brackets for holding the tank in place on the automobile.

A prior art saddle tank 25 is shown in FIG. 1. In order to mount tank 25, stock brackets 14 are replaced with special custom running board brackets 26 having flat, not rounded, vertical and horizontal legs. Tank 25 is basically a rectangular box which fits flush against the vertical and horizontal legs of custom brackets 26. In addition, two retaining straps 27 are used to retain tank 25 in place. Retaining straps 27 have an upper end secured to frame member 12 by a bolt 28 and a lower end secured to the horizontal leg of bracket 26 by an additional bolt 29. It is the straps 27 which secure tank 25 in place and hold the tank against movement relative to frame member 12.

The disadvantages of this prior art saddle tank have been discussed previously in the Background of the Invention section. One disadvantage is that tank 25 does not rise very close to the top of frame member 12 due to the need accommodate the upper securing bolt 28 and leave that bolt 28 accessible. Usually, there is a gap of 1 inch or more between the top of tank 25 and the top of frame member 12. Thus, tank 25 does not fill the entire space behind splash apron 10 as well as it might. This decreases the capacity of tank 25 somewhat. In addition, the need to use and affix custom brackets 26 and retaining straps 27 is disadvantageous.

Figure 6:
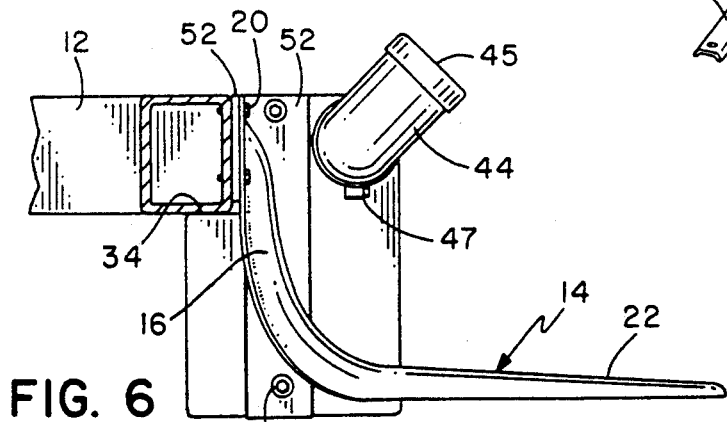
FIG. 6 is an end elevational view of the improved fuel tank of the present invention, the tank being shown in place attached to the side frame member of the automobile.
Figure 7:
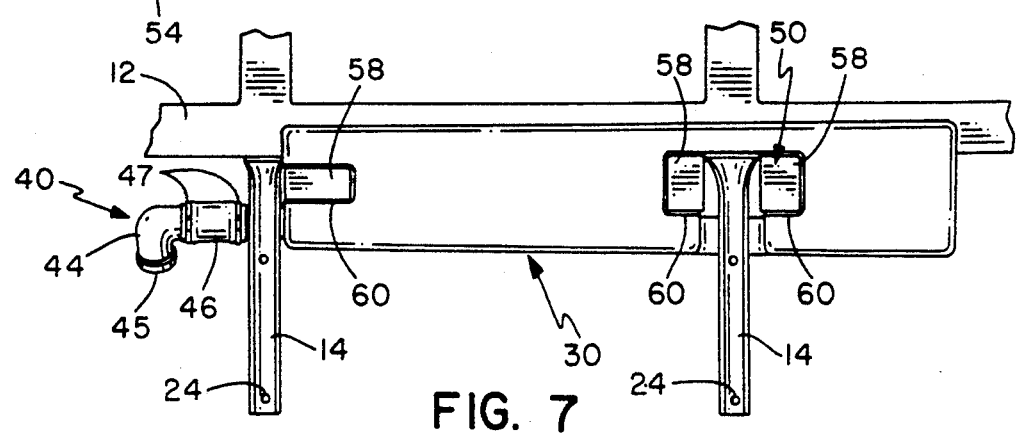
FIG. 7 is a bottom plan of the improved fuel tank of the present invention, the tank being shown in place attached to the side frame member of the automobile.
Figure 8:
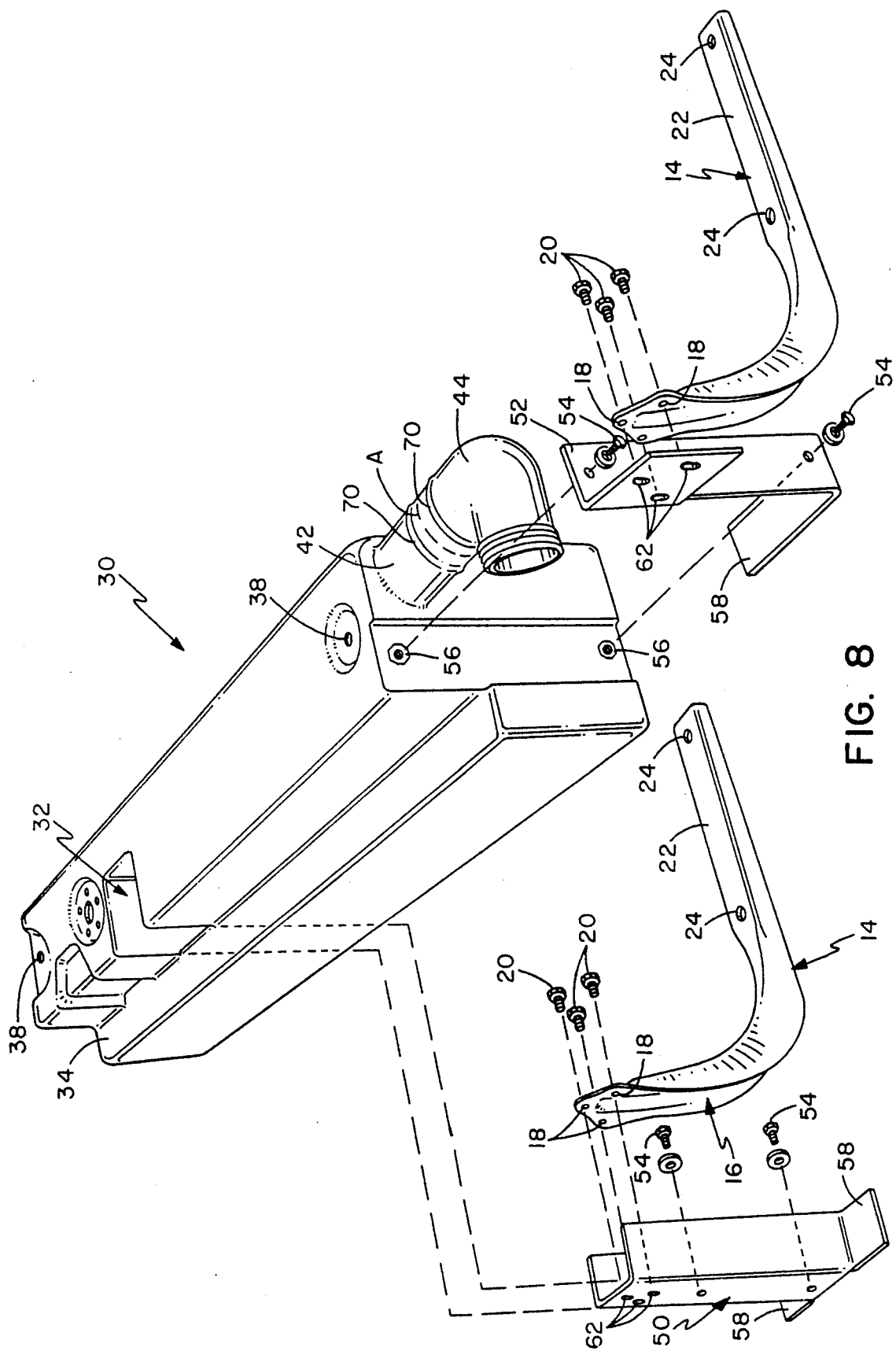
FIG. 8 is a perspective view of the improved fuel tank of the present invention shown in exploded form in combination with the running board brackets to illustrate how the running board brackets interact with the fuel tank components, the fuel tank being depicted as it comes from a mold therefor.

The improved saddle tank 30 according to this invention is shown in FIGS. 2-8. Saddle tank 30 is preferably molded out of plastic to define a hollow interior space in which fuel, such as gasoline, may be stored. Tank 30 includes a molded vertically extending pocket 32 through which one running board bracket 14 extends. As shown in FIGS. 6 and 8, the rear of tank 30 is notched at 34 to allow tank 30 to wrap under frame member 12 with the underside of frame member 12 being located above the notch. Pocket 32 is formed in front of notch 34 to extend above the notched portion of tank 30.

Tank 30 includes various fittings suitably secured thereto which are of generally conventional design. These fittings include a fuel pick up tube 35, a sender unit 36 for a fuel gauge, and a vent 37. These fittings are screwed or bolted to threaded inserts 38 provided for them in the of tank 30. The fittings 35-37 need not be described further as they form no part of the present invention.

In addition, tank 30 includes a fuel filler assembly 40 comprising a short stub section 42 secured to tank 30, an L-shaped filler elbow 44 spaced a small distance away from stub section 42, and a flexible hose 46 coupling sections 42 and 44 together. Elbow 44 is arranged to protrude to the front of tank 30 at approximately a 45° angle to extend out through splash apron 10. See FIG. 2. Elbow 44 has its outer end threaded to receive a threaded cap 45 thereon. Cap 45 is removed when tank 30 is to be filled with fuel.

An important feature of tank 30 is the use of attachment means for holding tank 30 in place on frame member 12 using just the stock running board brackets 14. This attachment means comprises a first U-shaped attachment bracket 50 is received in vertical pocket 32 and a second attachment bracket 52 received at one end of tank 30. Brackets 50 and 52 are each held to tank 30 by threaded fasteners 54 received in threaded blind inserts 56 provided in tank 30 when tank 30 is molded. In FIG. 8, only inserts 56 for end bracket 52 are shown. In addition, both brackets 50 and 52 have one or more horizontal flanges 58 at the lower end thereof which are received in shallow recesses 60 on the bottom face of tank 30 to additionally support tank 30. Thus, attachment brackets 50 and 52 are fixedly secured to tank 30 by fasteners 54 and, in effect, comprise part of tank 30.

The upper ends of each attachment bracket 50 and 52 have three bolt holes 62 in the same shape and spacing as the triangular pattern of holes 18 in the running board brackets 14. The holes 62 in brackets 50 and 52 are located above the notched portion of tank 30 so they may be abutted against frame member 12. In effect, that portion of the first attachment bracket 50 having holes 62 also forms the rear of part of pocket 32 extending above the notch. Preferably, holes 62 are vertically elongated somewhat to allow the user of the tank to vertically adjust the tank for the best fit.

In installing a saddle tank 30 according to this invention, splash apron 10, running board 8, and stock running board brackets 14 are first removed from car 2 if they are in place. Then, with frame member 12 exposed, saddle tank 30 is lifted into place until it abuts against frame member 12 with notch 34 wrapping under frame member 12. Saddle tank 30 is then moved along frame member 12 until the bolt hole patterns in attachment brackets 50 and 52 are aligned with the attachment holes normally provided in frame member 12 for running board brackets 14. With tank 30 held in this position, running board brackets 14 are then reattached by overlying brackets 14 on the attachment brackets 50 and 52 of tank 30 and by reinserting the fasteners 20 for brackets 14. Fasteners 20 will now pass through both running board brackets 14 and attachment brackets 50 and 52 to hold tank 30 in place on frame member 12.

When tank 30 is installed in this manner, one running board bracket 14 passes downwardly through pocket 32 provided in tank 30. The other running board bracket 14 passes downwardly along one side of tank 30. See FIG. 3. When tank 30 is installed in this fashion, it does not rest on top of brackets 14. Rather, it is simply abutted with brackets 14 as previously described to be secured to frame member 12 by brackets 14 when brackets 14 are secured thereto using fasteners 20.

FIG. 8 depicts tank 30 as it comes out of the mold before the fittings 35-37 are attached. Elbow 44 of fuel filler assembly is integrally molded to short stub section 42 as shown in FIG. 8 and points to the rear of tank 30. This is done for ease of molding. After tank 30 is molded, however, elbow 44 is separated from stub section 42 by cutting along the dotted line identified as A in FIG. 8 positioned between the two rings 70. Elbow 44 is pulled away from stub section 42 and is then rotated around to face out to the front of tank 30 at the 45° angle shown in FIG. 6. Elbow 44 is then coupled to stub section by flexible hose 46 held in place by hose clamps 47 abutting each of the rings 70. While this method of manufacturing the filler tube assembly is preferred when molding a plastic tank 30, any other suitable method and structure for providing a filler tube assembly could be used.

Saddle tank 30 of this invention has many advantages over prior art saddle tanks. First, the use of attachment brackets 50 and 52 on tank 30 allows tank 30 to rise higher along frame member 12 than prior art tanks to within at least approximately ½ inch of the top of frame member 12, which is the space need to accommodate fittings 35-37 should these fittings merely be place onto the top surface of tank 30. Fittings 35-37 could be recessed into the top surface of tank 30. In this case, tank 30 could rise the full height of frame member 12 to be substantially flush with the top of frame member 12. In either case, the capacity of tank 30 is maximized since the lower side of tank 30 desirably goes down to the level of running board 8. There is no longer a substantial unused space between the top of tank 30 and the top of frame member 12, as in tanks using retaining straps.

In addition, tank 30 can be easily attached to frame member 12 using only the stock running board brackets 14. There is no need to replace these stock brackets with custom brackets. As a consequence, there is no need to drill new holes in frame member 12 for attaching either custom brackets or retaining straps. All that need be done is to remove stock brackets 14, interpose tank 30 up against frame member 12 as described herein, and reattach the stock brackets in their normal location.

As described herein, saddle tank 30 is desirably molded from plastic. Attachment brackets 50 and 52, which are desirably made of metal, are then separately formed but integrally fixed to tank 30 using threaded fasteners. However, saddle tank could be formed entirely out of metal as well. In this case the attachment brackets 50 and 52 would integrally be connected to tank 30, either by being formed when tank 30 is formed, or by being welded thereto.

Various other modifications of this invention will be apparent to one skilled in the art. For example, saddle tank 30 could be used with any vehicle having a running board held on running board brackets, such as certain trucks, and not just a Model A Ford automobile. Thus, the scope of this invention is to be limited only by the appended claims.

I claim:

1. An improved saddle tank for a vehicle having a running board secured to a frame member of the vehicle by at least one running board bracket, wherein the running board bracket is generally L-shaped having a generally vertical leg secured to the frame member and a generally horizontal leg on top of which the running board is carried, which comprises:

attachment means on the saddle tank cooperable with the running board bracket for clamping the saddle tank between the frame member and the generally vertical leg of the running board bracket to hold the saddle tank in place on the frame member with the running board bracket attached to the frame member.

2. An improved saddle tank as recited in claim 1, wherein the attachment means comprises an attachment bracket on the saddle tank, wherein the attachment bracket is suited to be interposed between the frame member and the running board bracket when the running board bracket is attached to the frame member.

3. An improved saddle tank as recited in claim 2, wherein two running board brackets are used to hold the running board in place against the frame member, and wherein the attachment means comprises two spaced attachment brackets on the tank suited for being interposed between the frame member and a respective one of the running board brackets.

4. An improved saddle tank as recited in claim 3, wherein the saddle tank includes a vertical pocket through which a first running board bracket extends with the running board bracket connected to the frame member, and wherein a first attachment bracket forms a portion of the pocket which is suited to be abutted against the frame member.

5. An improved saddle tank as recited in claim 4, wherein the second running board bracket is suited to extend downwardly along one end of the tank and the second attachment bracket is located at the one end of the tank for cooperation with the second running board bracket.

6. An improved fuel tank as recited in claim 1, wherein the tank is sized to extend upwardly to within at least approximately ½ inch of the top of the frame member with the tank held in place thereon by the running board bracket.

7. An improved fuel tank as recited in claim 2, wherein the tank and attachment bracket are separately formed from one another, and wherein the attachment bracket is fixedly secured to the tank.

8. An improved fuel tank as recited in claim 7, wherein the tank is made from plastic and the attachment bracket from metal.

9. An improved fuel tank as recited in claim 8, wherein the attachment bracket is fixedly secured to the tank by threaded fasteners passing into the tank.

10. An improved fuel tank as recited in claim 8, wherein the attachment bracket includes a horizontal flange abutting against the tank for support of the tank on the bracket.

11. An improved saddle tank for a vehicle having a running board secured to a frame member of the vehicle by at least one running board bracket, which comprises:
an attachment bracket on the saddle tank suited to be interposed between the frame member and the running board bracket for holding the saddle tank in place on the frame member with the running board bracket attached to the frame member, further including fastener means passing through a plurality of holes in the running board bracket for attaching the running board bracket to the frame member, and wherein the attachment bracket includes a plurality of holes with an equivalent pattern and spacing as the holes in the running board bracket to allow the holes in the attachment bracket to be aligned with the holes in the running board bracket with the attachment bracket interposed between the frame member and the running board bracket, whereby the fastening means for the running board bracket also passes through the holes in the attachment bracket with the running board bracket attached to the frame member.

12. An improved saddle tank as recited in claim 11, wherein the holes in the attachment bracket are vertically elongated to allow vertical adjustment of the tank relative to the frame member.

13. An improved saddle tank as recited in claim 11, wherein two running board brackets are used to hold the running board in place against the frame member, and further including two spaced attachment brackets on the tank suited for being interposed between the frame member and a respective one of the running board brackets.

14. An improved saddle tank as recited in claim 13, wherein the saddle tank includes a vertical pocket through which a first running board bracket extends with the running board bracket connected to the frame member, and wherein a first attachment bracket forms a portion of the pocket which is suited to be abutted against the frame member.

15. An improved saddle tank as recited in claim 14, wherein the second running board bracket is suited to extend downwardly along one end of the tank and the second attachment bracket is located at the one end of the tank for cooperation with the second running board bracket.

16. An improved saddle tank for a vehicle having a running board secured to a frame member of the vehicle by at least one running board bracket, which comprises:
an attachment bracket on the saddle tank suited to be interposed between the frame member and the running board bracket for holding the saddle tank in place on the frame member with the running board bracket attached to the frame member, wherein the saddle tank includes a vertical pocket through which the running board bracket extends with the running board bracket connected to the frame member, and wherein the attachment bracket forms a portion of the pocket which is suited to be abutted against the frame member.

17. A method for installing a saddle tank on a vehicle having a running board supported on a frame member by at least one running board bracket, the running board bracket having a plurality of holes for receiving fasteners which pass into attachment holes in the frame member to hold the running board bracket to the frame member, the vehicle further including a splash apron on the vehicle extending between the running board bracket and a top of the frame member and defining a space between the splash apron and the frame member, which comprises:
(a) providing a saddle tank having an attachment bracket with holes in an equivalent pattern and spacing as the holes provided in the running board bracket, the saddle tank being sized to be received in the space between the splash apron and the frame member;
(b) removing the splash apron, running board and running board brackets from the frame member when in place on the frame member by removing the various fasteners therefor;
(c) abutting the saddle tank against the frame member until the holes in the attachment bracket are aligned with the attachment holes in the frame member;
(d) abutting the running board bracket against the attachment bracket until the holes therein are aligned with the holes in the attachment bracket and the attachment holes in the frame member;

(e) reattaching the running board bracket to the frame member by passing the fasteners therefor through the aligned holes and into the side frame member; and (f) reattaching the splash apron and the running board.

* * * * *